United States Patent
Croak et al.

(10) Patent No.: US 8,730,941 B1
(45) Date of Patent: May 20, 2014

(54) METHOD AND APPARATUS FOR PROVIDING MULTIPLE CALLING NAME IDENTIFIERS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1630 days.

(21) Appl. No.: 11/448,547

(22) Filed: Jun. 7, 2006

(51) Int. Cl.
*H04M 1/56* (2006.01)
*H04Q 3/72* (2006.01)
*H04M 3/42* (2006.01)

(52) U.S. Cl.
CPC .. *H04Q 3/72* (2013.01); *H04M 3/42* (2013.01)
USPC .......................................................... 370/352

(58) Field of Classification Search
CPC .. H04Q 2213/13091; H04Q 3/72; H04M 3/42
See application file for complete search history.

(56) References Cited

U.S. PATENT DOCUMENTS

| | | | | |
|---|---|---|---|---|
| 6,038,305 A | * | 3/2000 | McAllister et al. | 379/201.02 |
| 6,067,546 A | * | 5/2000 | Lund | 1/1 |
| 2005/0105705 A1 | * | 5/2005 | Elcock et al. | 379/142.01 |
| 2005/0287997 A1 | * | 12/2005 | Fournier | 455/415 |

* cited by examiner

*Primary Examiner* — Luat Phung

(57) ABSTRACT

A method and apparatus for enabling users of a packet network service, e.g., a VoIP network service, who live in the same household and share a common phone number to have individualized user identifiers to be transmitted along with their call setup messages are disclosed. For example, each user in the household would have a different user identifier which they could retrieve from an endpoint device immediately before dialing the phone number when they want to place a call that would transmit their personalized user identifier in the call setup message.

5 Claims, 4 Drawing Sheets

METHOD AND APPARATUS FOR PROVIDING MULTIPLE CALLING NAME IDENTIFIERS

The present invention relates generally to communication networks and, more particularly, to a method and apparatus for enabling multiple calling name identifiers for individual phone numbers in packet networks, e.g., Voice over Internet Protocol (VoIP) or SoIP (Service over Internet Protocol) network.

BACKGROUND OF THE INVENTION

Caller party identification for incoming calls is currently linked to the name of the subscriber on the billing account for traditional phone service. Given that multiple parties can share a single account, and an individual person can place a call from any phone line, the transmitted caller id information does not always convey the true identity of the calling party.

For example, members of a household often share a common phone number. When individuals in a household place a call using a phone tied to the common phone number, the calling party identification that gets transmitted in the call setup message is the name associated with the registered billing party. Other users of the same phone number will not be able to use their individual calling name information when making a phone call.

Therefore, a need exists for a method and apparatus for enabling multiple calling name identifiers for individual phone numbers.

SUMMARY OF THE INVENTION

In one embodiment, the present invention enables users of a packet network service, e.g., a VoIP network service, who live in the same household and share a common phone number to have individualized user identifiers to be transmitted along with their call setup messages. For example, each user in the household would have a different user identifier which they could retrieve from an endpoint device immediately before dialing the phone number when they want to place a call that would transmit their personalized user identifier in the call setup message.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
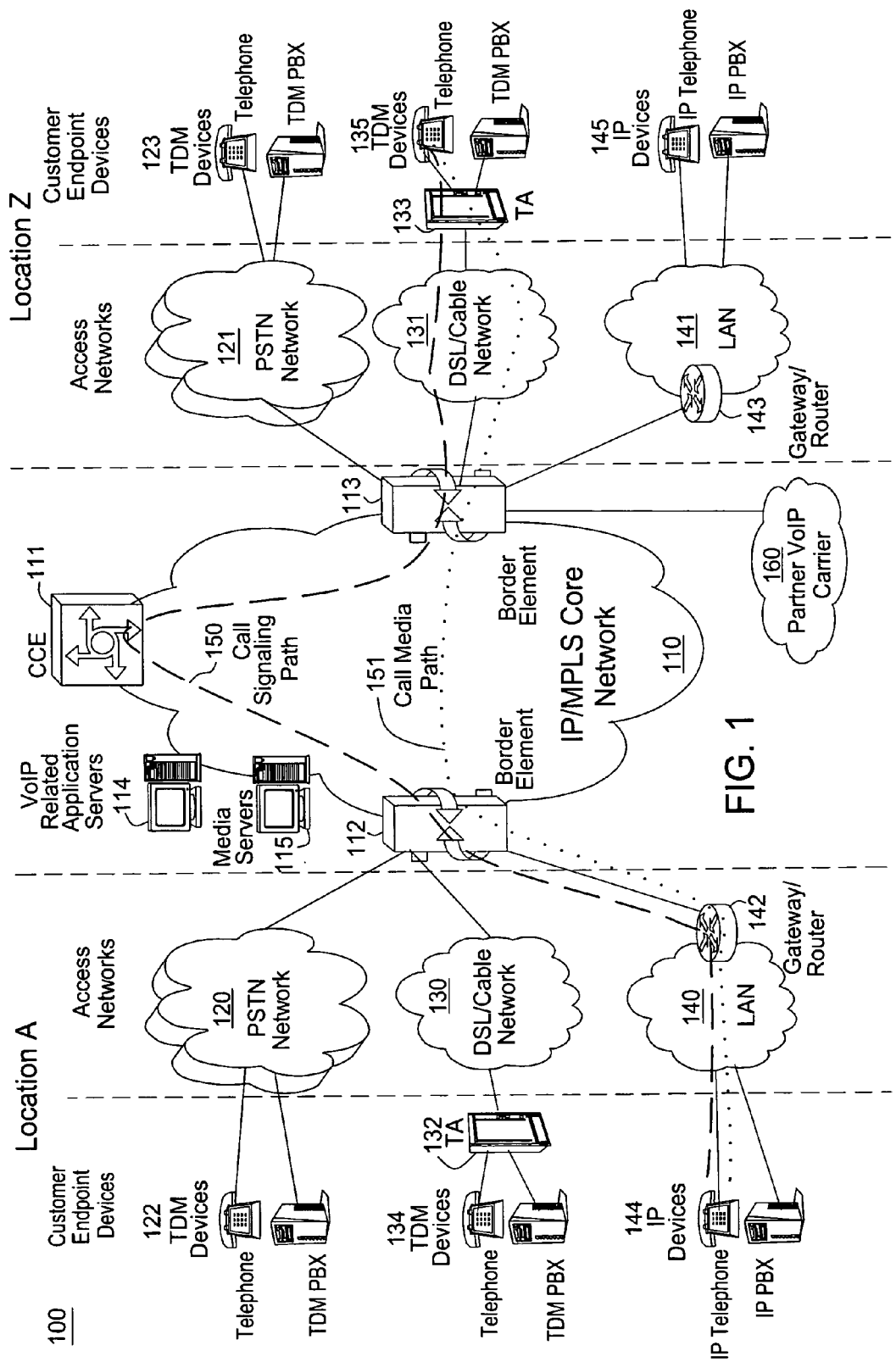
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Caller party identification for incoming calls is currently linked to the name of the subscriber on the billing account for traditional phone service. Given that multiple parties can share a single account, and an individual person can place a call from any phone line, the transmitted caller id information does not always convey the true identity of the calling party.

For example, members of a household often share a common phone number. When individuals in a household place a call using a phone tied to the common phone number, the calling party identification that gets transmitted in the call setup message is the name associated with the registered billing party. Other users of the same phone number will not be able to use their individual calling name information when making a phone call.

To address this need, the present invention enables users of a packet network service, e.g., a VoIP network service, who live in the same household and share a common phone number to have individualized calling name identifiers transmitted in their call setup messages. Each user in the household can create his or her own unique user identifier, e.g., in alphanumeric characters. These unique identifiers can be stored locally, e.g., within an endpoint device, e.g., an IP phone, a computer, and the like. Each of these unique identifiers can be associated with a speed dial or recall mechanism, e.g., pushing "*1" before dialing a call will recall the identifier "John Doe", whereas pushing "*2" before dialing a call will recall the identifier "John Doe, baseball coach", whereas pushing "*3" before dialing a call will recall the identifier "Jane Doe", and so on. In one embodiment, the unique identifier, e.g., the alphanumeric characters, is sent along with the call request from the endpoint device.

Figure 2:
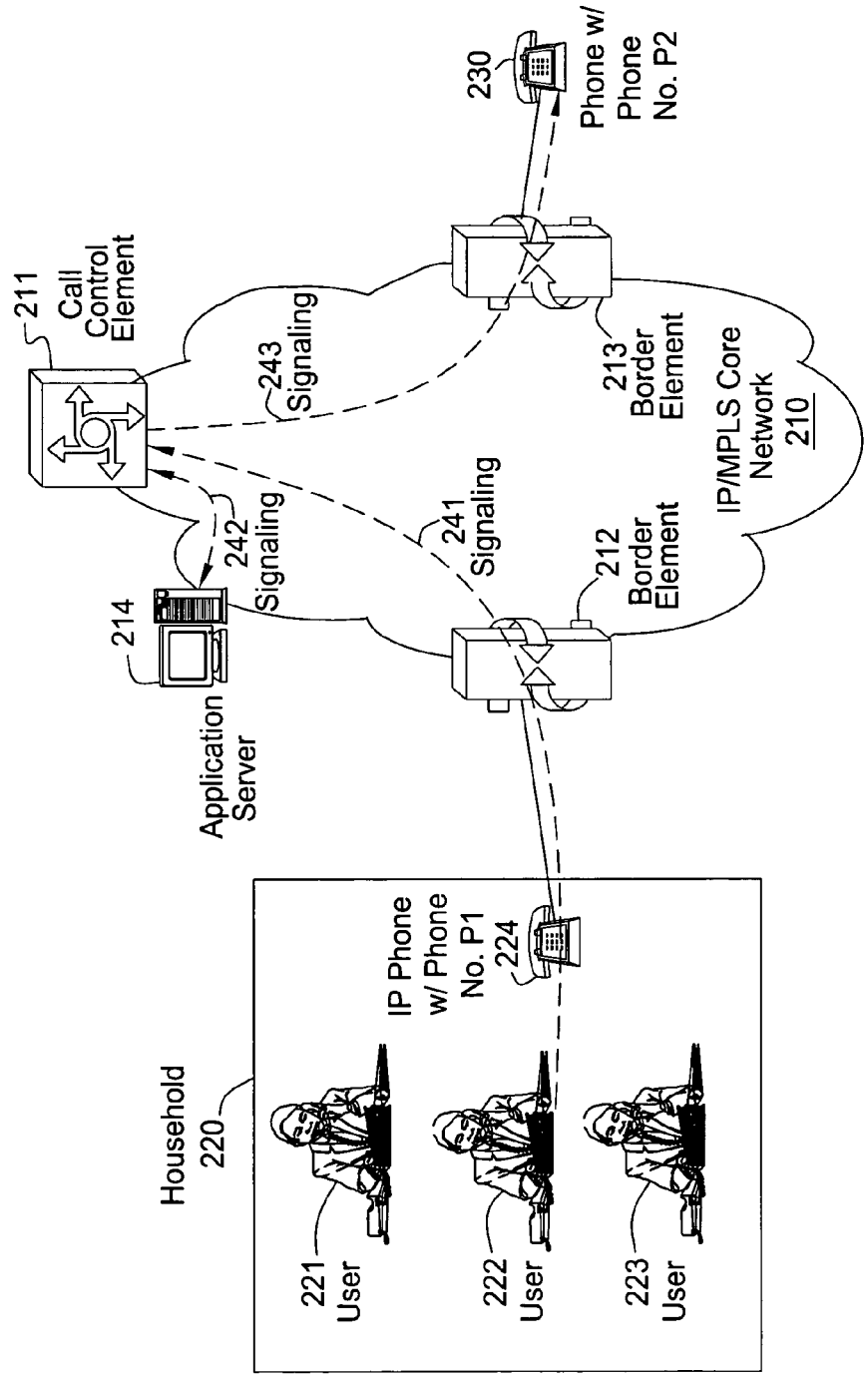
FIG. 2 illustrates an example of enabling multiple calling name identifiers for an individual phone number in a VoIP network of the present invention.

FIG. 2 illustrates an example of providing multiple calling name identifiers for an individual phone number in a packet network, e.g., a VoIP network. In FIG. 2, household 220 has 3 users, 221, 222, and 223, sharing a single IP phone 224 with a single phone number P1. User 221 is the registered billing user of the phone account. The default calling name identifier is the billing user's name and the calling number identifier is phone number P1. User 221 also has signed up for the individual calling name identifier service feature. User 221, user 222 and/or user 223 have also created and stored unique identifiers locally, e.g., within IP phone 224. User speed dial or recall identifier or mechanism has also been associated with the stored unique identifiers.

In one example, user 222 makes a call by dialing the pre-assigned speed dial or recall identifier for user 222 immediately before dialing a phone number P2 associated with phone 230. The speed dial or recall identifier is used to retrieve the proper unique identifier associated with user 222. In turn, CCE 211 receives a call setup message 241 and the recalled unique identifier via BE 212 from IP phone 224. CCE 211 accesses Application Server (AS) 214 via flow 242 to find out whether the calling number account has registered for the individual calling name identifier service feature. CCE 211 finds out that the calling number account is associated with the individual calling name identifier service feature. Then CCE 211 continues the call setup message via flow 243 towards the called party via BE 213 using the unique identifier of the calling user 222 instead of the identifier that is associated with the calling number account. However, in the case that no individual user identifier is contained in the call setup message, then the default calling name identifier of user 221 will be used.

Figure 3:
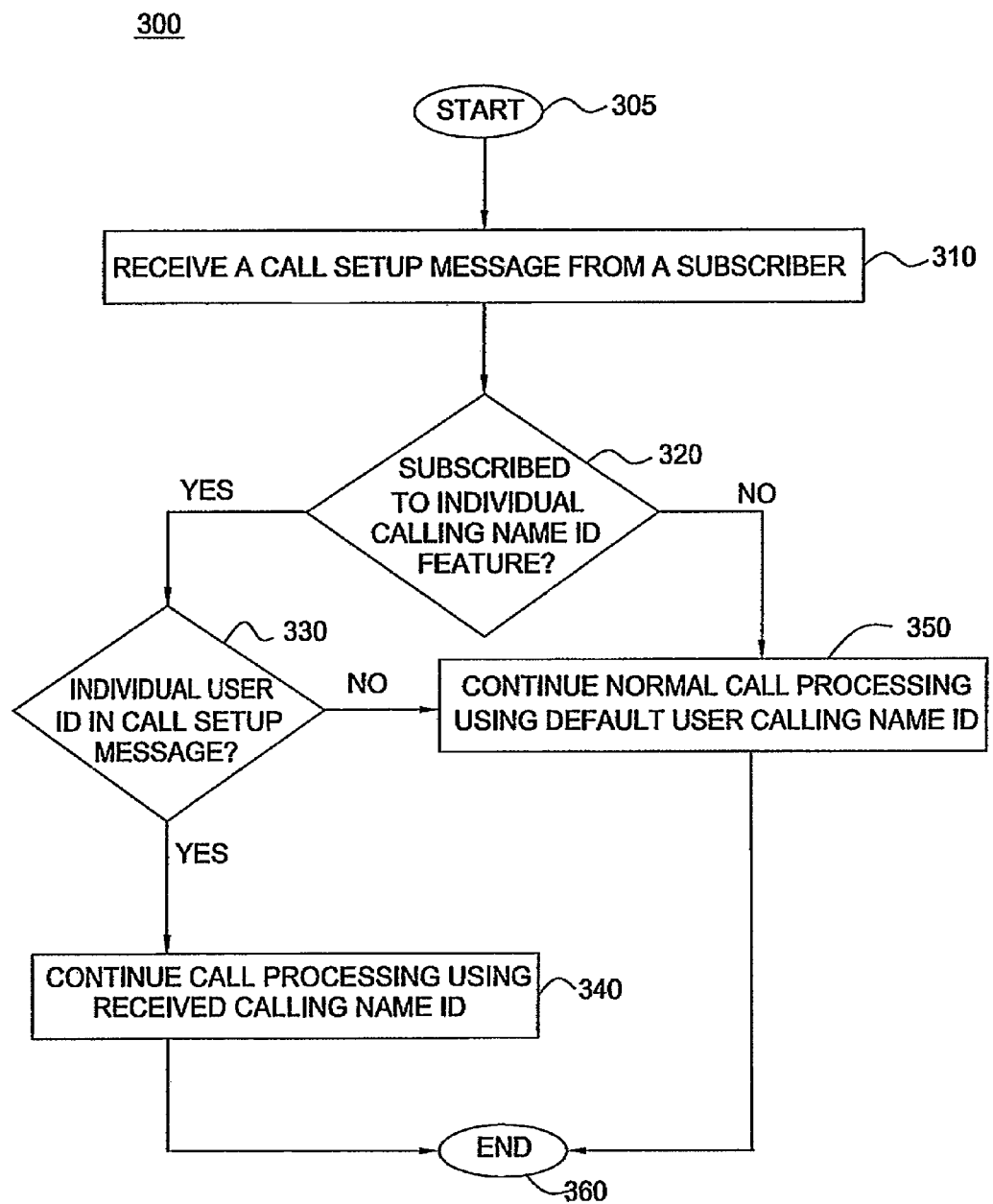
FIG. 3 illustrates a flowchart of a method for enabling multiple calling name identifiers for an individual phone number of the present invention.

FIG. 3 illustrates a flowchart of a method 300 for enabling multiple calling name identifiers for an individual phone number. Method 300 starts in step 305 and proceeds to step 310.

In step 310, the method receives a call setup message from a subscriber. Furthermore, a unique individual user identifier, e.g., an alphanumeric identifier is also received.

In step 320, the method checks if the calling number has subscribed to the individual calling name identifier service feature. If the calling number is associated as being subscribed to the individual calling name identifier service feature, then the method proceeds to step 330; otherwise, the method proceeds to step 350.

In step 330, the method checks if the call setup message contains a unique individual user identifier. If the call setup message contains a unique individual user identifier, then the method proceeds to step 340; otherwise, the method proceeds to step 350.

In step 340, the method continues the call setup message to the called party number by using the unique individual user identifier that was received from the IP endpoint in the calling name identifier field in the call setup message.

In step 350, the method continues the call setup message to the called party number by using the default calling name identifier in the calling name identifier field in the call setup message. The method ends in step 360.

Figure 4:
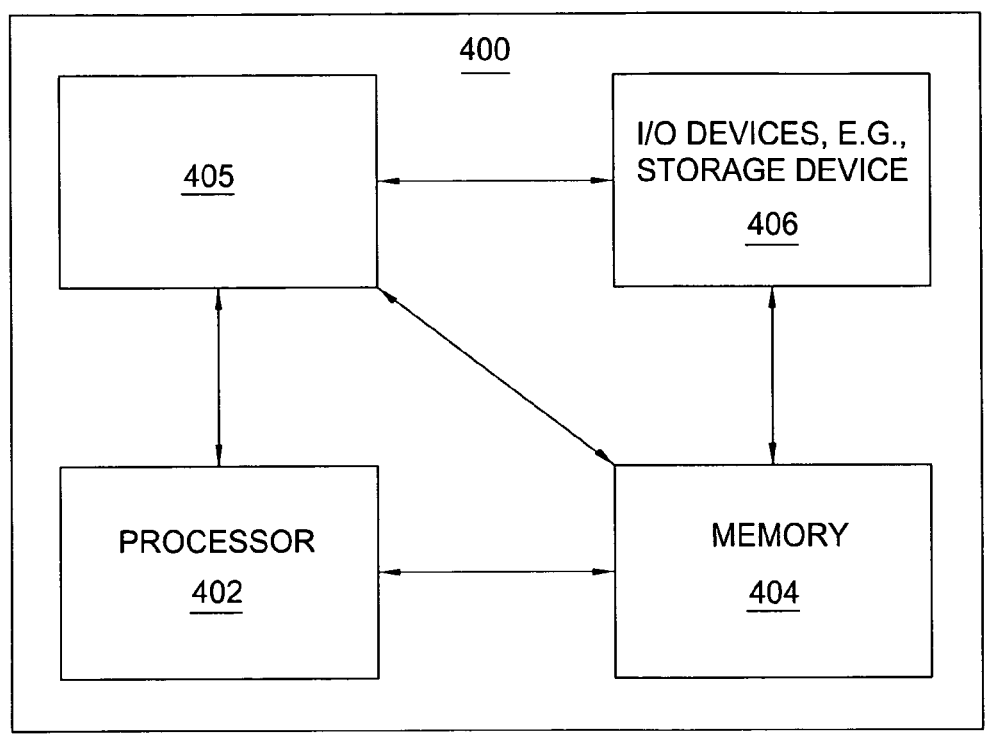
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), an individual calling name identifier module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present individual calling name identifier module or process 405 can be loaded into memory 404 and executed by processor 402 to implement the functions as discussed above. As such, the present individual calling name identifier process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a call using an individual user identifier for a phone number in a communication network, comprising:

receiving, by a processor of a call control element deployed in the communication network, a call setup message and the individual user identifier for a call from a customer endpoint device of a calling party, wherein the individual user identifier is different than a default calling name identifier associated with the calling party, wherein the individual user identifier is one of a plurality of individual user identifiers that is stored within the customer endpoint device, wherein the individual user identifier is recalled from the endpoint device via a speed dial identifier, wherein the individual user identifier comprises alphanumeric characters, wherein the individual user identifier is sent from the customer endpoint device along with the call setup message, wherein the customer endpoint device comprises a customer premises equipment and is deployed external to the communication network;

determining, by the processor, whether the calling party has subscribed to an individual calling name identifier service, wherein the processor communicates with an application server to determine whether the calling party has subscribed to the individual calling name identifier service; and processing, by the processor, the call using the individual user identifier when it is determined that the calling party has subscribed to the individual calling name identifier service, wherein the processing comprises inserting the individual user identifier in the call setup message, wherein the processing further comprises forwarding the call setup message towards a called party of the call.

2. The method of claim 1, wherein the communication network is an internet protocol network.

3. A non-transitory computer-readable medium storing instructions which, when executed by a processor of a call control element deployed in a communication network, cause the processor to perform operations for processing a call using an individual user identifier for a phone number in the communication network, the operations comprising:

receiving a call setup message and the individual user identifier for a call from a customer endpoint device of a calling party, wherein the individual user identifier is different than a default calling name identifier associated with the calling party, wherein the individual user identifier is one of a plurality of individual user identifiers that is stored within the customer endpoint device, wherein the individual user identifier is recalled from the endpoint device via a speed dial identifier, wherein the individual user identifier comprises alphanumeric characters, wherein the individual user identifier is sent from the customer endpoint device along with the call setup message, wherein the customer endpoint device comprises a customer premises equipment and is deployed external to the communication network;

determining whether the calling party has subscribed to an individual calling name identifier service, wherein the determining comprises communicating with an application server to determine whether the calling party has subscribed to the individual calling name identifier service; and processing the call using the individual user identifier when it is determined that the calling party has subscribed to the individual calling name identifier service, wherein the processing comprises inserting the individual user identifier in the call setup message, wherein the processing further comprises forwarding the call setup message towards a called party of the call.

4. The non-transitory computer-readable medium of claim 3, wherein the communication network is an internet protocol network.

5. An apparatus for processing a call using an individual user identifier for a phone number in a communication network, comprising:

a processor of a call control element deployed in the communication network; and a computer-readable medium storing instructions which, when executed by the processor, cause the processor to perform operations, the operations comprising:

receiving a call setup message and the individual user identifier for a call from a customer endpoint device of a calling party, wherein the individual user identifier is different than a default calling name identifier associated with the calling party, wherein the individual user identifier is one of a plurality of individual user identifiers that is stored within the customer endpoint device, wherein the individual user identifier is recalled from the endpoint device via a speed dial identifier, wherein the individual user identifier comprises alphanumeric characters, wherein the individual user identifier is sent from the customer endpoint device along with the call setup message, wherein the endpoint device comprises a customer premises equipment and is deployed external to the communication network;

determining whether the calling party has subscribed to an individual calling name identifier service, wherein the determining comprises communicating with an application server to determine whether the calling party has subscribed to the individual calling name identifier service; and processing the call using the individual user identifier if the calling party has subscribed to the individual calling name identifier service, wherein the processing means inserts the individual user identifier in the call setup message, wherein the processing further comprises forwarding the call setup message towards a called party of the call.

* * * * *